(12) United States Patent
Seki

(10) Patent No.: US 11,149,694 B2
(45) Date of Patent: Oct. 19, 2021

(54) CANISTER

(71) Applicant: Osaka Gas Chemicals Co., Ltd., Osaka (JP)

(72) Inventor: Kenji Seki, Osaka (JP)

(73) Assignee: Osaka Gas Chemicals Co., Ltd., Osaka (JP)

( * ) Notice: Subject to any disclaimer, the term of this patent is extended or adjusted under 35 U.S.C. 154(b) by 0 days.

(21) Appl. No.: 16/342,312

(22) PCT Filed: Oct. 20, 2017

(86) PCT No.: PCT/JP2017/038051
§ 371 (c)(1),
(2) Date: Apr. 16, 2019

(87) PCT Pub. No.: WO2018/079447
PCT Pub. Date: May 3, 2018

(65) Prior Publication Data
US 2019/0249624 A1    Aug. 15, 2019

(30) Foreign Application Priority Data

Oct. 24, 2016 (JP) .............................. JP2016-207830

(51) Int. Cl.
*F02M 25/08* (2006.01)
*B01D 53/04* (2006.01)
(52) U.S. Cl.
CPC ..... *F02M 25/0854* (2013.01); *B01D 53/0407* (2013.01); *F02M 25/08* (2013.01);
(Continued)
(58) Field of Classification Search
CPC ............... F02M 25/0854; F02M 25/08; F02M 2025/0881; B01D 53/0407; B01D 2253/102; B01D 2259/4516
See application file for complete search history.

(56) References Cited

U.S. PATENT DOCUMENTS 5,632,251 A * 5/1997 Ishikawa ............ F02M 25/0854
123/519
5,743,943 A * 4/1998 Maeda ............... B01D 53/0415
123/519
(Continued)

FOREIGN PATENT DOCUMENTS

EP           1446569 A1    8/2004
JP       2005325708 A    11/2005
(Continued)

*Primary Examiner* — Phutthiwat Wongwian
*Assistant Examiner* — Susan E Scharpf
(74) *Attorney, Agent, or Firm* — The Webb Law Firm

(57) ABSTRACT

Provided is a canister whose performance is enhanced while achieving the advantage of suppressing changes in temperature by using a heat storage material and overcoming the disadvantage of a reduction in the adsorption amount. A canister for treating evaporated fuel includes: a tank port that is in communication with an upper air chamber of a fuel tank of an internal combustion engine; a purge port that is in communication with an air intake path of the internal combustion engine; an atmospheric air port that is open to atmospheric air; and an adsorbent material chamber R that contains an activated carbon that adsorbs evaporated fuel that flows from the tank port to the atmospheric air port. A heat storage material is provided in a tank-side adjacent region T of the adsorbent material chamber R that is provided adjacent to the tank port, the heat storage material being a material obtained by encapsulating, into capsules, a phase change material that absorbs and releases latent heat according to changes in temperature.

3 Claims, 2 Drawing Sheets

(52) U.S. Cl.
CPC .................. *B01D 2253/102* (2013.01); *B01D 2259/4516* (2013.01); *F02M 2025/0881* (2013.01)

(56) References Cited

U.S. PATENT DOCUMENTS

| | | | | |
|---|---|---|---|---|
| RE38,844 E | * | 10/2005 | Hiltzik | B01D 53/02 123/519 |
| 7,841,321 B2 | | 11/2010 | Kosugi et al. | |
| 8,506,691 B2 | * | 8/2013 | Yamada | F02M 25/0854 96/146 |
| 8,596,250 B2 | * | 12/2013 | Sugiura | F02M 25/0854 123/519 |
| 8,801,840 B2 | * | 8/2014 | Sugiura | B01D 53/0407 96/131 |
| 2002/0078931 A1 | * | 6/2002 | Makino | F02M 25/0854 123/519 |
| 2006/0102156 A1 | * | 5/2006 | Yamauchi | B01D 53/0415 123/519 |
| 2006/0196480 A1 | * | 9/2006 | Kosugi | F02M 25/0854 123/516 |
| 2008/0184973 A1 | * | 8/2008 | Yamazaki | B01D 53/0415 123/519 |
| 2009/0266236 A1 | * | 10/2009 | Kosugi | B01D 53/0438 96/152 |
| 2010/0147152 A1 | * | 6/2010 | Kosugi | B01D 53/0415 96/146 |
| 2011/0077151 A1 | * | 3/2011 | Yamasaki | F02M 25/0854 502/416 |
| 2011/0197861 A1 | * | 8/2011 | Sugiura | F02M 25/0854 123/519 |
| 2011/0214572 A1 | * | 9/2011 | Hasegawa | B01D 53/02 96/122 |
| 2012/0012474 A1 | | 1/2012 | Yamada et al. | |
| 2012/0186563 A1 | * | 7/2012 | Hasegawa | B01D 53/0415 123/519 |
| 2012/0304865 A1 | * | 12/2012 | Sugiura | B01D 53/0446 96/131 |
| 2013/0186375 A1 | * | 7/2013 | Hasegawa | F02M 25/06 123/519 |
| 2013/0263740 A1 | * | 10/2013 | Mani | F02M 25/0854 96/112 |
| 2014/0124385 A1 | * | 5/2014 | Yamasaki | B01J 20/28042 206/0.7 |
| 2016/0271555 A1 | * | 9/2016 | Hiltzik | F02M 25/0872 |

FOREIGN PATENT DOCUMENTS

| | | |
|---|---|---|
| JP | 2006207485 A | 8/2006 |
| JP | 2012251431 A | 12/2012 |
| WO | 03046362 A1 | 6/2003 |

\* cited by examiner

CANISTER

CROSS-REFERENCE TO RELATED APPLICATIONS

This application is the United States national phase of International Application No. PCT/JP2017/038051 filed Oct. 20, 2017, and claims priority to Japanese Patent Application No. 2016-207830 filed Oct. 24, 2016, the disclosures of which are hereby incorporated by reference in their entirety.

TECHNICAL FIELD

The present invention relates to a canister for treating evaporated fuel to prevent the evaporated fuel from a fuel tank from being released into the atmospheric air.

BACKGROUND ART

Conventionally, a canister for treating evaporated fuel is known, the canister containing an adsorbent material that is made of an activated carbon or the like and adsorbs and captures evaporated fuel, which is generated by gasoline fuel stored in a fuel tank evaporating while the vehicle is not moving, so as to prevent the evaporated fuel from being released into the atmospheric air. The canister includes a tank port that is in communication with an upper portion of the fuel tank, an atmospheric air port with a leading end open to the atmospheric air, and a purge port through which the evaporated fuel desorbed (purged) from the adsorbent material flows. The evaporated fuel generated by an increase in the temperature of the fuel tank while the engine is running, while the vehicle is not moving, or the like flows from the tank port into the canister and toward the atmospheric air port, during which the evaporated fuel is adsorbed by the adsorbent material, and the evaporated fuel is thereby prevented from being released into the atmospheric air. The evaporated fuel adsorbed by the adsorbent material is desorbed (purged) by atmospheric air introduced from the atmospheric air port by a vacuum pump that is driven and controlled independently of the running of the engine and the negative pressure in the air intake pipe while the engine is running, and the adsorbent material is regenerated.

An adsorbent material such as an activated carbon has the property of increasing its adsorption volume as the temperature decreases and decreasing its adsorption volume as the temperature increases. Accordingly, it is desirable that the adsorbent material has a low temperature during adsorption of evaporated fuel and has a high temperature during purging of the evaporated fuel. On the other hand, fuel vapor releases heat corresponding to condensation heat when adsorbed by the adsorbent material and draws heat corresponding to evaporation heat when desorbed from the adsorbent material. That is, adsorption of fuel vapor into the adsorbent material corresponds to an exothermic reaction, and desorption of the same from the adsorbent material corresponds to an endothermic reaction. Accordingly, heat generation and heat absorption due to adsorption and desorption of fuel vapor act in a manner opposite to a desired temperature state of the adsorbent material, or in other words, in a manner that hinders the adsorption/desorption performance of the adsorbent material. Accordingly, in order to improve the performance of the canister, it is desired to suppress the temperature change in the adsorbent material caused by heat generation and heat absorption due to adsorption and desorption of fuel vapor.

To this end, Patent Document 1 discloses a canister that contains, together with an adsorbent material, a heat storage material that suppresses changes in temperature in the adsorbent material by utilizing latent heat. As the heat storage material used in Patent Document 1, microcapsules in which a phase change material that is made of a paraffin with a relatively low melting point such as tetradecane or pentadecane is encapsulated in outer shells, or pellet-shaped granules (molded heat storage bodies) made of such a material are used. As a result of a heat storage material being contained in the canister together with an adsorbent material, an increase in the temperature of the adsorbent material during adsorption of evaporated fuel is suppressed by latent heat (melting heat) generated when the phase change material contained in the heat storage material undergoes a phase change from the solid phase to the liquid phase, and a reduction in the temperature of the adsorbent material during desorption of evaporated fuel is suppressed by latent heat (solidification heat) generated when the phase change material contained in the heat storage material undergoes a phase change from the liquid phase to the solid phase, and thus the adsorption/desorption performance of the adsorbent material is improved.

Also, the canister disclosed in Patent Document 1 includes a case in which a main adsorbent material chamber to which the tank port and the purge port are connected, and second and third adsorbent material chambers separated from the main adsorbent material chamber via a separation plate are provided. The third adsorbent material chamber is connected to the atmospheric air port, and the second adsorbent material chamber is positioned under the third adsorbent material chamber while being in communication with the third adsorbent material chamber. Also, the main adsorbent material chamber and the second adsorbent material chamber are in communication with each other on the lower side. Then, during supply of fuel to the fuel tank, evaporated fuel flows from the tank port into the canister and to the atmospheric air port.

In the canister of Patent Document 1 described above, the main adsorbent material chamber contains an activated carbon, a first heat storage material that has a phase change temperature of 25 to 90° C., and a second heat storage material that has a phase change temperature of −10 to less than 25° C. Also, the second adsorbent material chamber contains an activated carbon, the first heat storage material, and the second heat storage material. Furthermore, the third adsorbent material chamber contains an activated carbon and the second heat storage material.

As described above, in the canister of Patent Document 1, all of the main adsorbent material chamber and the second and third adsorbent material chambers contain the second heat storage material, and thus the desorbing amount of evaporated fuel increases, and the amount of evaporated fuel remaining in the canister decreases. Accordingly, it is possible to reduce the amount of evaporated fuel discharged from the atmospheric air port.

PRIOR ART DOCUMENT

Patent Document

Patent Document 1: JP 2006-207485A

DISCLOSURE OF THE INVENTION

Problem to be Solved by the Invention

However, although changes in the temperature of the adsorbent material are suppressed as a result of a heat storage material being contained in the canister, the amount of activated carbon contained in the canister decreases by an amount corresponding to the amount of the heat storage material. As a result, the adsorption performance of the canister, or in other words, the amount of evaporated fuel that can be adsorbed by the canister decreases.

As described above, in the canister disclosed in Patent Document 1, all of the adsorbent material chambers of the canister contain a heat storage material, and thus the amount of activated carbon contained in the canister decreases by an amount corresponding to the amount of heat storage material.

The present invention has been made in view of the problem described above, and it is an object of the present invention to provide a canister whose performance is enhanced while achieving the advantage of suppressing temperature changes by using a heat storage material and overcoming the disadvantage of a reduction in the adsorption amount.

Means for Solving Problem

To achieve the object, a characteristic feature of a canister of the present invention lies in that the canister is a canister for treating evaporated fuel, the canister including: a tank port that is in communication with an upper air chamber of a fuel tank of an internal combustion engine; a purge port that is in communication with an air intake path of the internal combustion engine; an atmospheric air port that is open to atmospheric air; and an adsorbent material chamber that contains an activated carbon that adsorbs evaporated fuel that flows from the tank port to the atmospheric air port, wherein the adsorbent material chamber includes at least a tank-side adjacent region provided adjacent to the tank port and an atmospheric air-side adjacent region provided adjacent to the atmospheric air port, a heat storage material is provided in the tank-side adjacent region provided adjacent to the tank port, the heat storage material being a material obtained by encapsulating, into capsules, a phase change material that absorbs and releases latent heat according to changes in temperature and has a phase change temperature of 35° C. or more, the activated carbon contained in the tank-side adjacent region has a BWC of 15 g/dL or more, and the activated carbon contained in the atmospheric air-side adjacent region has a BWC of 3 g/dL or more and less than 15 g/dL.

According to the characteristic feature described above, a heat storage material is provided in the tank-side adjacent region of the adsorbent material chamber that is provided adjacent to the tank port, the heat storage material being a material obtained by encapsulating, into capsules, a phase change material that absorbs and releases latent heat according to changes in temperature. Accordingly, the heat storage material suppresses changes in the temperature of the activated carbon and prevents a reduction in the performance of the activated carbon. Also, because the activated carbon is provided in the tank-side adjacent region, a reduction in the amount of activated carbon contained in the adsorbent material chamber is suppressed. Thus, according to the characteristic feature described above, it is possible to provide a canister whose performance is enhanced while achieving the advantage of suppressing changes in temperature by using a heat storage material and overcoming the disadvantage of a reduction in the adsorption amount.

Also, the phase change material contained in the heat storage material has a phase change temperature of 35° C. or more. Accordingly, when the temperature of the activated carbon increases to 35° C. or more during adsorption of evaporated fuel, the phase change material contained in the heat storage material undergoes a phase change from the solid phase to the liquid phase, and an increase in the temperature of the activated carbon can be effectively suppressed by latent heat (melting heat) generated during the phase change, which is preferable.

Also, because the activated carbon contained in the tank-side adjacent region has a BWC of 15 g/dL or more, and the activated carbon that has high adsorptionability is provided in the tank-side adjacent region, it is possible to treat a large amount of evaporated fuel that flows into the canister, particularly when fuel is supplied to the fuel tank, which is preferable. As used herein, BWC refers to the value of butane working capacity as determined by ASTM D5228.

Also, if evaporated fuel remains in the atmospheric air-side adjacent region provided adjacent to the atmospheric air port after purging, the evaporated fuel may leak to the outside through the atmospheric air port when the temperature increases. Accordingly, it is important to sufficiently desorb evaporated fuel during purging. According to the characteristic feature described above, the activated carbon contained in the atmospheric air-side adjacent region has a BWC of less than 15 g/dL, and the activated carbon that has high desorptionability is provided in the atmospheric air-side adjacent region, and thus the purging process can be performed appropriately, which is preferable.

Another characteristic feature of the canister of the present invention lies in that an atmospheric air-side heat storage material is provided in the atmospheric air-side adjacent region of the adsorbent material chamber that is provided adjacent to the atmospheric air port, the atmospheric air-side heat storage material being a material that contains a phase change material that has a phase change temperature of 10° C. or more and less than 35° C.

Desorption (purging) of evaporated fuel from the activated carbon takes place as a result of atmospheric air flowing in from the atmospheric air port due to air drawn from the purge port. Heat is removed during desorption of evaporated fuel from the activated carbon, and thus the temperature of the activated carbon decreases, which reduces the desorption performance of the activated carbon. Particularly when the temperature of the activated carbon falls below 10° C., desorption performance decreases significantly. According to the characteristic feature described above, in the atmospheric air-side adjacent region of the adsorbent material chamber that is provided adjacent to the atmospheric air port, an atmospheric air-side heat storage material that contains a phase change material that has a phase change temperature of 10° C. or more and less than 35° C. is provided. Thus, a reduction in the temperature of the activated carbon during desorption of evaporated fuel is suppressed by latent heat (solidification heat) generated when the phase change material contained in the heat storage material undergoes a phase change from the liquid phase to the solid phase. Accordingly, an excessive reduction in the temperature of the activated carbon contained in the atmospheric air-side adjacent region is suppressed, and the purging process can be performed appropriately, which is preferable.

Another characteristic feature of the canister of the present invention lies in that the activated carbon contained in the atmospheric air-side adjacent region is in the form of hollow pellets that have a cavity inside or honeycomb pellets.

According to the characteristic feature described above, the activated carbon contained in the atmospheric air-side adjacent region is in the form of hollow pellets that have a cavity inside or honeycomb pellets, and the activated carbon that has a large outer surface area and high desorptionability is provided in the atmospheric airside adjacent region, and thus the purging process can be performed appropriately, which is preferable.

Another characteristic feature of the canister of the present invention lies in that the tank-side adjacent region is divided into a plurality of divided regions, and the phase change temperature of the phase change material contained in the heat storage material provided in a divided region is lower the closer the divided region is to the tank port.

The evaporated fuel flowing from the tank port into the adsorbent material chamber flows toward the atmospheric air port while being adsorbed by the activated carbon, and thus the temperature of the evaporated fuel increases gradually due to adsorption heat. Accordingly, the temperature of the activated carbon also increases gradually as the distance from the tank port increases, and a temperature gradient occurs. According to the characteristic feature described above, the tank-side adjacent region is divided into a plurality of divided regions, and the phase change temperature of the phase change material contained in the heat storage material provided in a divided region is lower the closer the divided region is to the tank port. Accordingly, a phase change takes place at a low temperature in a divided region close to the tank port, and a phase change takes place at a high temperature in a divided region far from the tank port, and thus absorption of latent heat occurs in conformity with the temperature gradient of the activated carbon, which is preferable.

Another characteristic feature of the canister of the present invention lies in that the tank-side adjacent region is a region where the temperature of the activated carbon increases to 35° C. or more due to heat generated by adsorption of evaporated fuel by the activated carbon during supply of fuel to the fuel tank.

When supplying fuel to the fuel tank, a large amount of evaporated fuel may flow into the canister at a time. The evaporated fuel flowing from the tank port forms an adsorption zone from the vicinity of the tank port toward the atmospheric air port, and the temperature of the activated carbon in the adsorption zone increases due to adsorption heat. The adsorption performance of the activated carbon decreases significantly when the temperature of the activated carbon exceeds 35° C. According to the characteristic feature described above, the tank-side adjacent region is a region where the temperature of the activated carbon increases to 35° C. or more due to heat generated by adsorption of evaporated fuel by the activated carbon during supply of fuel to the fuel tank, and a heat storage material is provided in the tank-side adjacent region. It is therefore possible to suppress a situation in which the temperature of the activated carbon exceeds 35° C., which is preferable.

Another characteristic feature of the canister of the present invention lies in that the proportion of the heat storage material provided in the tank-side adjacent region is 20 vol % or more and 50 vol % or less of the total volume of the activated carbon and the heat storage material contained in the tank-side adjacent region.

According to the characteristic feature described above, the proportion of the heat storage material provided in the tank-side adjacent region is 20 vol % or more and 50 vol % or less of the total volume of the activated carbon and the heat storage material contained in the tank-side adjacent region. Accordingly, it is possible to sufficiently suppress changes in temperature without significantly reducing the adsorption amount in the tank-side adjacent region, which is preferable.

Another characteristic feature of the canister of the present invention lies in that the tank-side adjacent region has a volume that is 40% or more and 85% or less of the volume of the adsorbent material chamber.

According to the characteristic feature described above, the tank-side adjacent region has a volume that is 40% or more and 85% or less of the volume of the adsorbent material chamber, and it is therefore possible to sufficiently suppress changes in temperature without significantly reducing the adsorption amount in the canister as a whole, which is preferable. In particular, the tank-side adjacent region preferably has a volume of 1.2 L or more and 2.5 L or less.

Another characteristic feature of the canister of the present invention lies in that the tank-side adjacent region as a whole has a GWC value of 70 g or more and 100 g or less.

According to the characteristic feature described above, the tank-side adjacent region as a whole has a GWC value of 70 g or more and 100 g or less, and thus evaporated fuel can be adsorbed properly, particularly when fuel is supplied to the fuel tank, which is preferable. As used herein, the GWC value refers to the value of gasoline working capacity measured using gasoline vapor instead of butane used to determine BWC, and is used as an indicator of gasoline adsorption/desorption performance of a canister in which an activated carbon is used.

BEST MODE FOR CARRYING OUT THE INVENTION

First Embodiment (1) Overall Configuration of Canister

Figure 1:
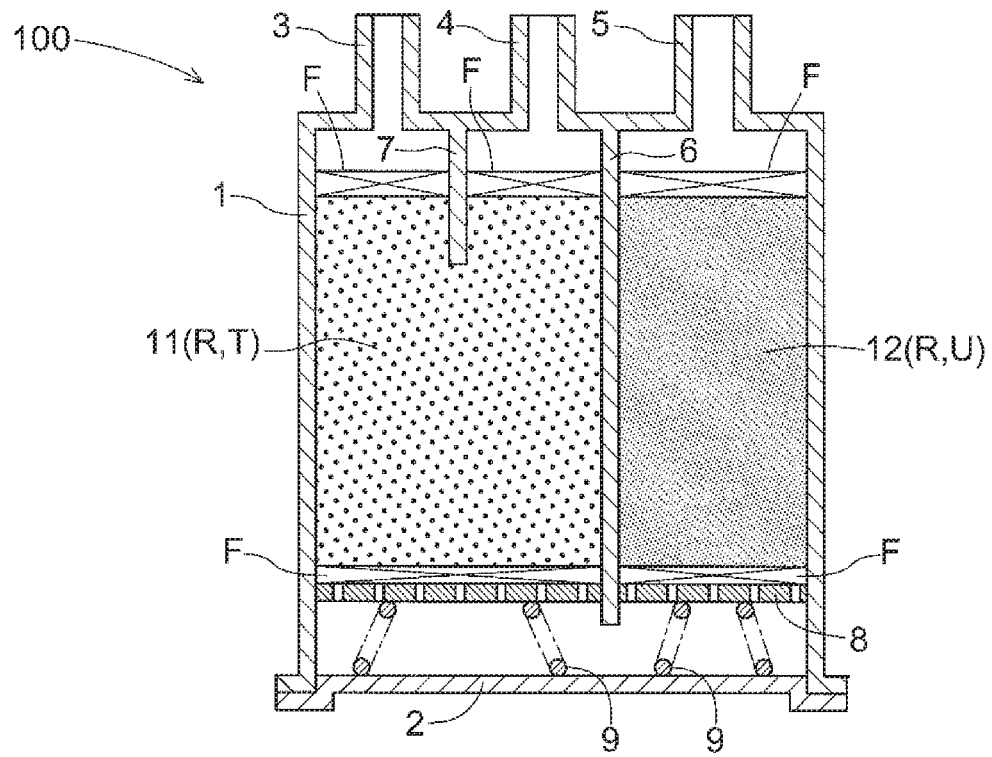
FIG. 1 is a schematic cross-sectional view showing a structure of a canister.

Hereinafter, an overall configuration of a canister 100 will be described. FIG. 1 shows a cross-sectional view of a canister 100 according to a first embodiment. The canister 100 is installed to treat evaporated fuel from a fuel tank provided in an automobile. The canister 100 includes a case 1, a cover 2, plates 8, coil springs 9, and filters F. An adsorbent material chamber R is formed inside the canister 100, and an activated carbon is contained in the adsorbent material chamber R.

The case 1 is an open-bottom hollow cylindrical member made of a synthetic resin (for example, nylon). The cover 2 is a disc-shaped member made of synthetic resin (for example, nylon). The cover 2 is bonded to the bottom side of the case 1 through, for example, vibration welding, adhesive bonding, or the like, and closes the opening of the case 1.

On the upper side of the case 1, a tank port 3, a purge port 4, and an atmospheric air port 5 are provided. The tank port 3 is in communication with an upper portion of the fuel tank (not shown) of the automobile, and the evaporated fuel from the fuel tank flows into the case 1 through the tank port 3.

The purge port 4 is in communication with an air intake path (not shown) of the internal combustion engine. The air intake path is in communication with an air intake pipe of the internal combustion engine, or is connected to a vacuum pump that is driven and controlled independently of the running of the engine. The atmospheric air port 5 is open to atmospheric air, and atmospheric air flows into the case 1 through the atmospheric air port 5.

Inside the case 1, a partition wall 6 and an auxiliary partition wall 7 are formed. The partition wall 6 is a partition wall that extends from the inner upper end of the case 1 to the vicinity of the cover 2, and is provided at a position between the purge port 4 and the atmospheric air port 5. The auxiliary partition wall 7 is a short partition wall that extends from the inner upper end of the case 1 toward the cover 2, and is provided at a position between the tank port 3 and the purge port 4.

The internal space of the case 1 is divided into a first region 11 and a second region 12 by the partition wall 6. In the present embodiment, an activated carbon is contained in the first region 11 and the second region 12. Also, a heat storage material is provided in the first region 11 (Example 1 described later), or in both the first region 11 and the second region 12 (Example 2 described later).

The filters F are provided in an upper portion and a lower portion of each of the first region 11 and the second region 12. The filters F are filters made of a synthetic resin non-woven fabric, or filters made of foamed urethane, and are configured to allow evaporated fuel and air to pass therethrough. The plates 8 are provided in the lower portions of the first region 11 and the second region 12. The plates 8 are metal plates in which a plurality of through holes are formed, and are configured to allow evaporated fuel and air to pass therethrough. The plates 8 are biased upward by the coil springs 9, and the activated carbon and the heat storage material contained in the first region 11 and the second region 12 are compressed upward.

With the configuration described above, in the canister 100, a U-shaped flow path extending between the tank port 3 (and the purge port 4) and the atmospheric air port 5 is formed. The evaporated fuel flowing from the tank port 3 first flows into the first region 11, passes under the plates 8, and flows into the second region 12. The first region 11 and the second region 12 contain an activated carbon that adsorbs the evaporated fuel flowing from the tank port 3 to the atmospheric air port 5, and hereinafter they may also be collectively referred to as the adsorbent material chamber R. Also, the first region 11 is provided adjacent to the tank port 3, and may also be referred to as a tank-side adjacent region T. The second region 12 is provided adjacent to the atmospheric air port 5, and may also be referred to as an atmospheric air-side adjacent region U.

As the adsorbent material contained in the adsorbent material chamber R, an activated carbon is used. For example, an activated carbon granulated and molded into a predetermined shape, or crushed carbon that has a uniform grain size is used. Also, as the activated carbon, for example, an activated carbon made from wood, coal, coconut shell, or the like can be used.

As the heat storage material contained in the adsorbent material chamber R, a micro-capsule type heat storage material that is obtained by encapsulating, into capsules, a phase change material that absorbs and releases latent heat according to changes in temperature, and is granulated and molded into a predetermined shape is used. The micro-capsule type heat storage material can be produced by a known method such as a coacervation method, or an in-situ method (interface reaction method) using a phase change material as the core material.

The phase change material is not particularly limited as long as it is a material that can undergo a phase change between the solid phase and the liquid phase according to changes in the temperature of the activated carbon, and an organic compound or an in organic compound can be used. Specific examples include: linear aliphatic hydrocarbons such as tetradecane, pentadecane, hexadecane, heptadecane, octadecane, nonadecane, eicosane, heneicosane, and docosane; natural wax; petroleum wax; hydrates of inorganic compounds such as $LiNO_3.3H_2O$, $Na_2SO_4.10H_2O$, $Na_2HPO_4.12H_2O$; fatty acids such as capric acid, lauric acid, palmitic acid, and myristic acid; higher alcohols that have 12 to 15 carbon atoms; ester compounds such as methyl palmitate, methyl stearate, isopropyl palmitate, butyl stearate, stearyl stearate, and myristyl myristate; and the like.

The phase change materials listed above as examples can be classified into phase change materials that have a phase change temperature of 35° C. or more and phase change materials that have a phase change temperature of 10° C. or more and less than 35° C.

The phase change materials that have a phase change temperature of 35° C. or more include eicosane, heneicosane, docosane, natural wax, petroleum wax, $Na_2HPO_4.12H_2O$, lauric acid, palmitic acid, myristic acid, higher alcohols that have 14 carbon atoms or more, stearyl stearate, and myristyl myristate.

The phase change materials that have a phase change temperature of 10° C. or more and less than 35° C. include tetradecane, pentadecane, hexadecane, heptadecane, octadecane, nonadecane, $LiNO_3.3H_2O$, $Na_2SO_4.10H_2O$, capric acid, higher alcohols that have less than 14 carbon atoms, methyl palmitate, methyl stearate, isopropyl palmitate, and butyl stearate.

(2) Tank-Side Adjacent Region T

In the present embodiment, a heat storage material obtained by encapsulating, into capsules, a phase change material that absorbs and releases latent heat according to changes in temperature is provided in the tank-side adjacent region T (the first region 11) provided adjacent to the tank port 3.

The phase change material contained in the heat storage material provided in the tank-side adjacent region T (the first region 11) preferably has a phase change temperature of 35° C. or more.

It is preferable that the proportion of the heat storage material provided in the tank-side adjacent region T (the first region 11) is 20 vol % or more and 50 vol % or less of the total volume of the activated carbon and the heat storage material contained in the first region 11.

The tank-side adjacent region T (the first region 11) preferably has a volume of 1.2 L or more and 2.5 L or less. Also, the atmospheric air-side adjacent region U (the second region 12) preferably has a volume of 0.45 L or more and 1.8 L or less. In this case, it is preferable that the tank-side adjacent region T (the first region 11) has a volume that is 40% or more and 85% or less of the volume of the adsorbent material chamber R, or in other words, the total volume of the first region 11 and the second region 12. As a result of the tank-side adjacent region T having a volume as described above, it is possible to sufficiently suppress changes in temperature without significantly reducing the adsorption amount in the canister as a whole, which is preferable.

As an example of the present embodiment, for example, the first region 11 may have a volume of 2.0 L, and the second region 12 may have a volume of 1.0 L. In this case, the first region 11 can have a volume that is 66.6% of the volume of the adsorbent material chamber R.

However, the size of the tank-side adjacent region T and the size of the atmospheric air-side adjacent region U can be set arbitrarily according to the internal combustion engine and the fuel tank to which the canister 100 is attached.

The activated carbon contained in the tank-side adjacent region T (the first region 11) preferably has a BWC of 15 g/dL or more. As used herein, BWC refers to the value of butane working capacity as determined by ASTM D5228, and the same applies in the embodiments and the examples given below in this specification.

Examples of the activated carbon that has a BWC of 15 g/dL or more include BAX1500 (butane adsorption performance: 60.1 wt %, packing density: 0.297 g/ml, and BWC: 15.1 g/dL) available from INGEVITY, a JACOBI trial product (butane adsorption performance: 56.6 wt %, packing density: 0.327 g/ml, and BWC: 15.6), and the like.

(3) Atmospheric Air-Side Adjacent Region U

A configuration is also possible in which only an activated carbon is contained in the atmospheric air-side adjacent region U (the second region 12) provided adjacent to the atmospheric air port 5 without a heat storage material. It is preferable to provide a heat storage material (atmospheric air-side heat storage material) that contains a phase change material that has a phase change temperature of 10° C. or more and less than 35° C. in the atmospheric air-side adjacent region U (the second region 12).

The activated carbon contained in the atmospheric airside adjacent region U (the second region 12) preferably has a BWC of less than 15 g/dL. The activated carbon contained in the atmospheric air-side adjacent region U more preferably has a BWC of 11 g/dL or less, and even more preferably 7 g/dL or less, and more preferably 3 g/dL or more, and even more preferably 4 g/dL or more.

Activated carbon that has a low BWC value can be produced by adjusting the temperature during activation process, the retention time in the activation process, or the like to reduce the degree of activation. Alternatively, an activated carbon that has a low BWC value can be produced by mixing a non-porous material or a material that has a low BWC value.

Examples of the activated carbon that has a BWC of 3 g/dL or more and less than 15 g/dL include BAX1100 (butane adsorption performance: 37.1 wt %, packing density: 0.348 g/ml, and BWC: 11.4 g/dL) available from INGEVITY, and the like.

As the activated carbon that has a BWC of 3 g/dL or more and less than 15 g/dL, star-shaped pellets, solid pellets formed in gear-shaped carbon or the like, hollow pellets that have a cavity inside, or honeycomb pellets may be used. As the hollow pellets that have a cavity inside, for example, hollow cylindrical pellets that have a cylindrical cavity parallel to the central axis may be used, and as the honeycomb pellets, honeycomb pellets as shown in FIG. 4 may be used.

Figure 4:
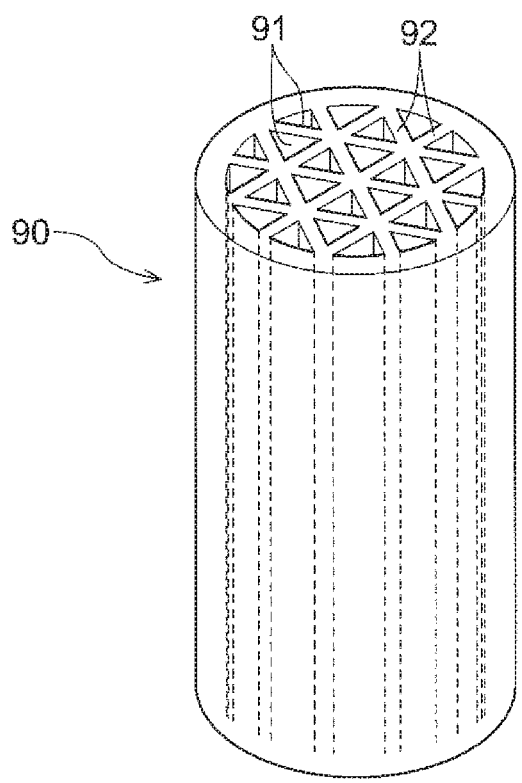
FIG. 4 is a perspective view showing a structure of a honeycomb pellet.

FIG. 4 shows a structure of a honeycomb pellet 90 that is an example of an activated carbon granulated and molded into a predetermined shape using a binder resin. The honeycomb pellet 90 has a cylindrical shape, and a plurality of through holes 91 are formed parallel to the central axis thereof. The through holes 91 are formed such that partition walls 92 between through holes 91 intersect at an angle of 60°. Each through hole 91 has an equilateral triangular cross section.

The activated carbon in the form of hollow pellets or honeycomb pellets as described above includes many cavities, and thus has a large surface area and low packing density. As a result, the activated carbon in the form of hollow pellets or honeycomb pellets as described above has a low BWC value. Thus, the adsorption performance for evaporated fuel is low, or in other words, desorptionability is high, and thus the processing of purging evaporated fuel can be performed appropriately.

Hereinafter, with respect to the canister 100 according to the first embodiment, specific examples of the activated carbon and the heat storage material contained in the first region 11 and the second region 12 will be described as Example 1 and Example 2.

Example 1

A mixture of a heat storage material and an activated carbon is provided in the first region 11. As the activated carbon, column-shaped activated carbon pellets that have a BWC (butane working capacity as determined by ASTM D5228, the same applies hereinafter) of 15.2 g/dL, a diameter of 2 mm, and a length of 2 to 8 mm are used. As the heat storage material, a heat storage material that contains myristyl myristate as a phase change material that has a phase change temperature of 39° C. is used.

The first region 11 has a packing volume of 2.0 L, and 1.2 L of the activated carbon and 0.8 L of the heat storage material are mixed, and the mixture is packed in the first region 11. That is, the first region 11 is provided with 60 vol % the activated carbon and 40 vol % the heat storage material relative to the total volume of the activated carbon and the heat storage material contained in the first region 11.

The second region 12 has a packing volume of 1.0 L, and only contains an activated carbon. As the activated carbon, column-shaped activated carbon pellets that have a BWC of 11.3 g/dL, a diameter of 2 mm, and a length of 2 to 8 mm are used.

Example 2

The configuration of the first region 11 is the same as that of Example 1. That is, a mixture of a heat storage material and an activated carbon is provided in the first region 11. As the activated carbon, column-shaped activated carbon pellets that have a BWC of 15.2 g/dL, a diameter of 2 mm, and a length of 2 to 8 mm are used. As the heat storage material, a heat storage material that contains eicosane as a phase change material that has a phase change temperature of 36° C. is used.

A mixture of a heat storage material and an activated carbon is provided in the second region 12. As the activated carbon, column-shaped activated carbon pellets that have a BWC of 11.3 g/dL, a diameter of 2 mm, and a length 2 to 8 mm are used. As the heat storage material, a heat storage material that contains hexadecane as a phase change material that has a phase change temperature of 18° C. is used.

The second region 12 has a packing volume of 1.0 L and 0.8 L of the activated carbon and 0.2 L of the heat storage material are mixed, and the mixture is packed in the second region 12. That is, the second region 12 is provided with 80 vol % the activated carbon and 20 vol % the heat storage material relative to the total volume of the activated carbon and the heat storage material contained in the second region 12.

In the canisters 100 configured in Example 1 and Example 2, during supply of fuel to the fuel tank, evaporated fuel flows into the canister 100, the temperature of the activated carbon increases, and the temperature of the activated carbon in the first region 11 (the tank-side adjacent region T) reaches 35° C. or more. Thus, the heat storage material is provided in the region.

Second Embodiment

In the first embodiment described above, the canister 100 includes a first region 11 and a second region 12. A canister 100 according to a second embodiment includes a first region 21, a second region 22, and a third region 23. In the description of the second embodiment given below, the constituent elements that are the same as those of the first embodiment are given the same reference numerals, and a description thereof may be omitted.

Figure 2:
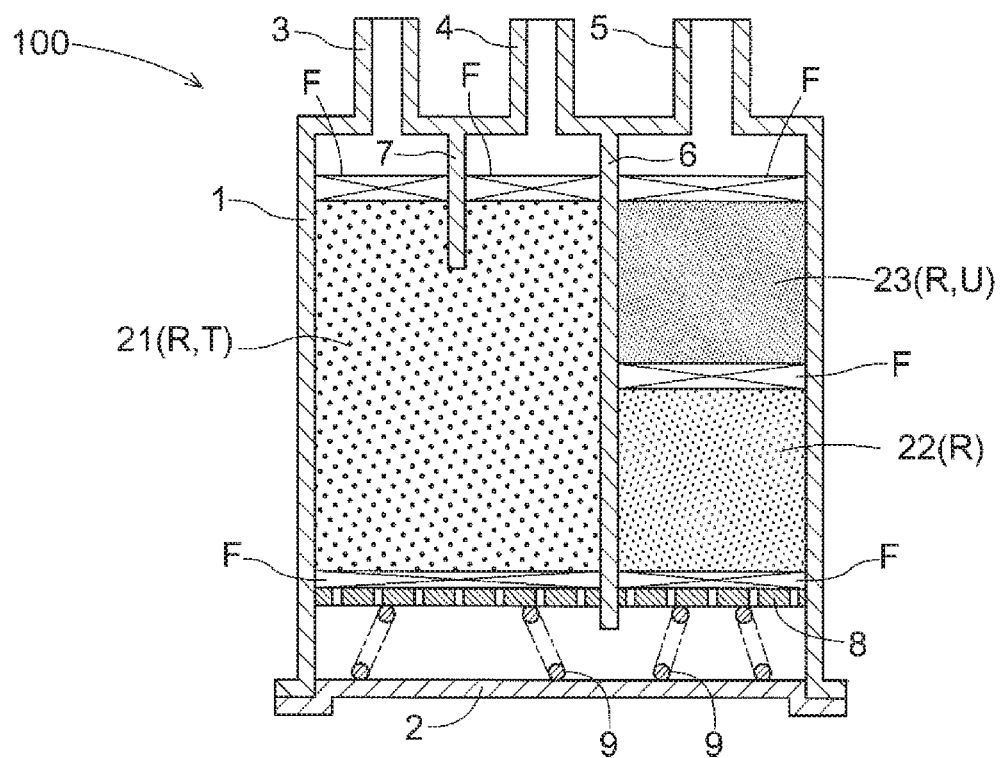
FIG. 2 is a schematic cross-sectional view showing a structure of a canister.

FIG. 2 shows a cross-sectional view of the canister 100 according to the second embodiment. As in the first embodiment, the internal space of a case 1 is divided into right and left spaces by a partition wall 6. The space on the right side of the diagram (the space on the atmospheric air port 5 side) is divided into upper and lower spaces by a filter F. The space on the tank port 3 side formed by the partition wall 6 is referred to as a first region 21. In the space on the atmospheric air port 5 side, the lower space (the space on the cover 2 side) is referred to as a second region 22, and the upper space (the space on the atmospheric air port 5 side) is referred to as a third region 23.

It is preferable that the first region 21 has a volume of 1.2 L or more and 2.5 L or less, the second region 22 has a volume of 0.3 L or more and 1 L or less, and the third region 23 has a volume of 0.1 L or more and 0.5 L or less.

As an example of the present embodiment, for example, the first region 21 may have a volume of 2.0 L, the second region 22 may have a volume of 0.7 L, and the third region 23 may have a volume of 0.3 L.

With the configuration described above, in the canister 100, as in the first embodiment, a U-shaped flow path extending between the tank port 3 (and the purge port 4) and the atmospheric air port 5 is formed. The evaporated fuel flowing from the tank port 3 first flows into the first region 21, passes under the plates 8, and flows into the second region 22 and the third region 23. The first region 21, second region 22, and the third region 23 contain an activated carbon that adsorbs the evaporated fuel flowing from the tank port 3 to the atmospheric air port 5. Hereinafter, the first region 21, the second region 22, and the third region 23 may be collectively referred to as an adsorbent material chamber R. Also, the first region 21 is provided adjacent to the tank port 3, and may also be referred to as a tank-side adjacent region T. The third region 23 is provided adjacent to the atmospheric air port 5, and may also be referred to as an atmospheric air-side adjacent region U.

Although the size of the tank-side adjacent region T and the size of the atmospheric air-side adjacent region U are described above, the size of tank-side adjacent region T and the size of the atmospheric air-side adjacent region U can be set arbitrarily according to the internal combustion engine and the fuel tank to which the canister 100 is attached.

In one mode, the phase change material contained in the heat storage material provided in the first region 21 and the second region 22 preferably has a phase change temperature of 35° C. or more. Also, the phase change material contained in the heat storage material provided in the third region 23 preferably has a phase change temperature of 10° C. or more and less than 35° C.

In another mode, the phase change material contained in the heat storage material provided in the first region 21 preferably has a phase change temperature of 35° C. or more. Also, the phase change material contained in the heat storage material provided in the third region 23 preferably has a phase change temperature of 10° C. or more and less than 35° C.

Also, the proportion of the heat storage material provided in the tank-side adjacent region T (the first region 21) is preferably 20 vol % or more and 50 vol % or less of the total volume of the activated carbon and the heat storage material contained in the first region 21. It is thereby possible to sufficiently suppress changes in temperature without significantly reducing the adsorption amount in the tank-side adjacent region T, which is preferable.

Hereinafter, with respect to the canister 100 according to the second embodiment, specific examples of the activated carbon and the heat storage material contained in the first region 21, the second region 22, and the third region 23 will be described as Example 3, Example 4, and Example 5.

Example 3

A mixture of a heat storage material and an activated carbon is provided in the first region 21. As the activated carbon, column-shaped activated carbon pellets that have a BWC of 15.2 g/dL, a diameter of 2 mm, and a length of 2 to 8 mm are used. As the heat storage material, a heat storage material that contains myristyl myristate as a phase change material that has a phase change temperature of 39° C. is used.

The first region 21 has a packing volume of 2.0 L, and 1.2 L of the activated carbon and 0.8 L of the heat storage material are mixed, and the mixture is packed in the first region 21. That is, the first region 21 is provided with 60 vol % the activated carbon and 40 vol % the heat storage material relative to the total volume of the activated carbon and the heat storage material contained in the first region 21.

A mixture of a heat storage material and an activated carbon is provided in the second region 22. As the activated carbon, column-shaped activated carbon pellets that have a BWC of 15.2 g/dL, a diameter of 2 mm, and a length of 2 to 8 mm are used. As the heat storage material, a heat storage material that contains myristyl myristate as a phase change material that has a phase change temperature of 39° C. is used.

The second region 22 has a packing volume of 0.7 L, and 0.42 L of the activated carbon and 0.28 L of the heat storage material are mixed, and the mixture is packed in the second region 22. That is, the second region 22 is provided with 60 vol % the activated carbon and 40 vol % the heat storage material relative to the total volume of the activated carbon and the heat storage material contained in the second region 22.

The third region 23 has a packing volume of 0.3 L, and only contains an activated carbon. As the activated carbon, an activated carbon molded into hollow cylindrical pellets that have a BWC of 8.4 g/dL, an outer diameter of 4 mm, and an inner diameter of 2 mm is used.

Example 4

The first region 21 and the second region 22 are the same as those of Example 3.

The third region 23 has a packing volume of 0.3 L, and only contains an activated carbon. As the activated carbon, honeycomb pellets 90 as shown in FIG. 4 that have a BWC of 8.4 g/dL are used. Each honeycomb pellet 90 has a shape that has an outer diameter of 6 mm, an outer circumferential wall thickness of 0.6 mm, and a partition wall 92 thickness of 0.4 mm.

Example 5

As in Example 3, a mixture of a heat storage material and an activated carbon is provided in the first region 21. As the activated carbon, column-shaped activated carbon pellets that have a BWC of 15.2 g/dL, a diameter of 2 mm, and a length of 2 to 8 mm are used. As the heat storage material, a heat storage material that contains myristyl myristate as a phase change material that has a phase change temperature of 39° C. is used.

The first region 21 has a packing volume of 2.0 L, and 1.2 L of the activated carbon and 0.8 L of the heat storage material are mixed, and the mixture is packed in the first region 21. That is, the first region 21 is provided with 60 vol % the activated carbon and 40 vol % the heat storage material relative to the total volume of the activated carbon and the heat storage material contained in the first region 21.

The second region 22 has a packing volume of 0.7 L, and only contains an activated carbon. As the activated carbon, column-shaped activated carbon pellets that have a BWC of 11.3 g/dL, a diameter of 2 mm, and a length of 2 to 8 mm are used.

A mixture of a heat storage material and an activated carbon is provided in the third region 23. As the activated carbon, column-shaped activated carbon pellets that have a BWC of 11.3 g/dL, a diameter of 2 mm, and a length of 2 to 8 mm are used. As the heat storage material, a heat storage material that contains hexadecane as a phase change material that has a phase change temperature of 18° C. is used.

The third region 23 has a packing volume of 0.3 L, and 0.24 L of the activated carbon and 0.06 L of the heat storage material are mixed, and the mixture is packed in the third region 23. That is, the third region 23 is provided with 80 vol % the activated carbon and 20 vol % the heat storage material relative to the total volume of the activated carbon and the heat storage material contained in the third region 23.

Third Embodiment

In the first embodiment described above, the canister 100 includes a first region 11 and a second region 12. A canister 100 according to a third embodiment includes a first region 31, a second region 32, a third region 33, a fourth region 34, and a fifth region 35. In the description of the third embodiment given below, the constituent elements that are the same as those of the first embodiment are given the same reference numerals, and a description thereof may be omitted.

Figure 3:
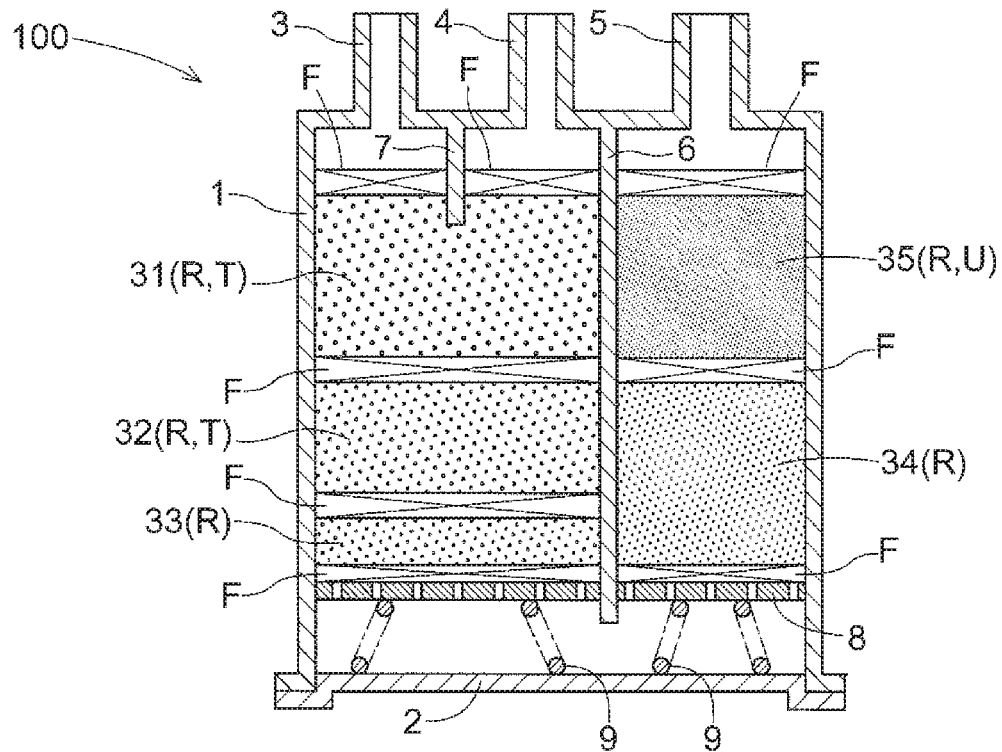
FIG. 3 is a schematic cross-sectional view showing a structure of a canister.

FIG. 3 shows a cross-sectional view of the canister 100 according to the third embodiment. As in the first embodiment, the internal space of a case 1 is divided into right and left spaces by a partition wall 6. As in the second embodiment, the space on the right side of the diagram (the space on the atmospheric air port 5 side) is divided into upper and lower spaces by a filter F. The space on the left side of the diagram (the space on the tank port 3 side) is divided vertically into three spaces by filters F.

The three spaces formed by vertically dividing the space on the left side of the diagram (on the tank port 3 side) are referred to as, from top (i.e., from the tank port 3 side) to bottom, a first region 31, a second region 32, and a third region 33. In the space on the atmospheric air port 5 side, the lower space (the space on the cover 2 side) is referred to as a fourth region 34, and the upper space (the space on the atmospheric air port 5 side) is referred to as a fifth region 35.

It is preferable that the first region 31 has a volume of 0.5 L or more and 1.5 L or less, the second region 32 has a volume of 0.3 L or more and 0.9 L or less, the third region 33 has a volume of 0.2 L or more and 0.6 L or less, the fourth region 34 has a volume of 0.3 L or more and 0.9 L or less, and the fifth region 35 has a volume of 0.1 L or more and 0.7 L or less.

As an example of the present embodiment, for example, the first region 31 has a volume of 1.0 L, the second region 32 has a volume of 0.6 L, and the third region 33 has a volume of 0.4 L. The fourth region 34 may have a volume of 0.6 L, and the fifth region 35 may have a volume of 0.4 L.

With the configuration described above, in the canister 100, as in the first embodiment, a U-shaped flow path extending between the tank port 3 (and the purge port 4) and the atmospheric air port 5 is formed. The evaporated fuel flowing from the tank port 3 first flows into the first region 31, the second region 32, and the third region 33 in this order, passes under the plates 8, and flows into the fourth region 34 and the fifth region 35. The first region 31, the second region 32, the third region 33, the fourth region 34, and the fifth region 35 contain an activated carbon that adsorbs the evaporated fuel flowing from the tank port 3 to the atmospheric air port 5, and hereinafter they may also be collectively referred to as an adsorbent material chamber R.

In the present embodiment, a heat storage material is provided in the first region 31 and the second region 32. That is, in the present embodiment, the first region 31 and the second region 32 correspond to a tank-side adjacent region T, and a heat storage material obtained by encapsulating, into capsules, a phase change material that absorbs and releases latent heat according to changes in temperature is provided in the first region 31 and the second region 32. The phase change material contained in the heat storage material provided in the first region 31 and the second region 32 preferably has a phase change temperature of 35° C. or more.

The tank-side adjacent region T is divided into a plurality of divided regions (the first region 31 and the second region 32), and the phase change temperature of the phase change material contained in the heat storage material provided in a divided region is lower as the closer the divided region is to the tank port 3. That is, the phase change material contained in the heat storage material provided in the first region 31 has a phase change temperature lower than that of the phase change material contained in the heat storage material provided in the second region 32.

The third region 33 only contains an activated carbon.

Here, the size of the tank-side adjacent region T and the size of the atmospheric air-side adjacent region U can be set arbitrarily according to the internal combustion engine and the fuel tank to which the canister 100 is attached. In particular, it is preferable to set a region where the temperature of the activated carbon increases to 35° C. or more due to heat generated by adsorption of evaporated fuel by the activated carbon during supply of fuel to the fuel tank as the tank-side adjacent region T, and provide a heat storage material in this region.

Depending on the type of vehicle to which the canister 100 is mounted, the temperature of the third region 33 may increase to 45° C. or more, or 50° C. or more due to heat generated by adsorption of evaporated fuel by the activated carbon during supply of fuel to the fuel tank. In this case, it is preferable to provide a heat storage material in the third region 33.

Also, the fourth region 34 only contains an activated carbon.

Also, a heat storage material is provided in the fifth region 35. That is, in the present embodiment, the fifth region 35 corresponds to an atmospheric airside adjacent region U, and a heat storage material obtained by encapsulating, into capsules, a phase change material that absorbs and releases latent heat according to changes in temperature is provided in the fifth region 35. The phase change material contained in the heat storage material provided in the fifth region 35 preferably has a phase change temperature of 10° C. or more and less than 35° C.

Also, the proportion of the heat storage material provided in the first region 31 that is the tank-side adjacent region T is preferably 20 vol % or more and 50 vol % or less relative to the total volume of the activated carbon and the heat storage material contained in the first region 31. Likewise, the proportion of the heat storage material provided in the second region 32 that is the tank-side adjacent region T is preferably 20 vol % or more and 50 vol % or less relative to the total volume of the activated carbon and the heat storage material contained in the second region 32. It is thereby possible to sufficiently suppress changes in temperature without significantly reducing the adsorption amount in the tank-side adjacent region T, which is preferable.

Hereinafter, with respect to the canister 100 according to the third embodiment, specific examples of the activated carbon and the heat storage material contained in the regions will be described as Example 6.

Example 6

A mixture of a heat storage material and an activated carbon is provided in the first region 31. As the activated carbon, column-shaped activated carbon pellets that have a BWC of 15.2 g/dL, a diameter of 2 mm, and a length of 2 to 8 mm are used. As the heat storage material, a heat storage material that contains myristyl myristate as a phase change material that has a phase change temperature of 39° C. is used.

The first region 31 has a packing volume of 1.0 L, and 0.6 L of the activated carbon and 0.4 L of the heat storage material are mixed, and the mixture is packed in the first region 31. That is, the first region 31 is provided with 60 vol % the activated carbon and 40 vol % the heat storage material relative to the total volume of the activated carbon and the heat storage material contained in the first region 31.

A mixture of a heat storage material and an activated carbon is provided in the second region 32. As the activated carbon, column-shaped activated carbon pellets that have a BWC of 15.2 g/dL, a diameter of 2 mm, and a length of 2 to 8 mm are used. As the heat storage material, a heat storage material that contains PW115 wax available from Nippon Seiro Co., Ltd. as a phase change material that has a phase change temperature of 48° C. is used.

The second region 32 has a packing volume of 0.6 L, and 0.36 L of the activated carbon and 0.24 L of the heat storage material are mixed, and the mixture is packed in the second region 32. That is, the second region 32 is provided with 60 vol % the activated carbon and 40 vol % the heat storage material relative to the total volume of the activated carbon and the heat storage material contained in the second region 32.

The third region 33 has a packing volume of 0.4 L, and only contains an activated carbon. As the activated carbon, column-shaped activated carbon pellets that have a BWC of 15.2 g/dL, a diameter of 2 mm, and a length of 2 to 8 mm are used.

The fourth region 34 has a packing volume of 0.6 L, and only contains an activated carbon. As the activated carbon, column-shaped activated carbon pellets that have a BWC of 11.3 g/dL, a diameter of 2 mm, and a length of 2 to 8 mm are used.

A mixture of a heat storage material and an activated carbon is provided in the fifth region 35. As the activated carbon, 2 mm column-shaped activated carbon pellets that have a BWC of 11.3 g/dL are used. As the heat storage material, a heat storage material that contains hexadecane as a phase change material that has a phase change temperature of 18° C. is used.

The fifth region 35 has a packing volume of 0.4 L, and 0.32 L of the activated carbon and 0.08 L of the heat storage material are mixed, and the mixture is packed in the fifth region 35. That is, the fifth region 35 is provided with 80 vol % the activated carbon and 20 vol % the heat storage material relative to the total volume of the activated carbon and the heat storage material contained in the fifth region 35.

Example 7

The first region 31 to the fourth region 34 are the same as those of Example 6.

A mixture of a heat storage material and an activated carbon is provided in the fifth region 35. As the activated carbon, 4 mm hollow cylindrical pellets (with an outer diameter of 4 mm and an inner diameter of 2 mm) that have a BWC of 8.4 g/dL are used. As the heat storage material, a heat storage material that contains hexadecane as a phase change material that has a phase change temperature of 18° C. is used.

The fifth region 35 has a packing volume of 0.4 L, and 0.32 L of the activated carbon and 0.08 L of the heat storage material are mixed, and the mixture is packed in the fifth region 35. That is, the fifth region 35 is provided with 80 vol % the activated carbon and 20 vol % the heat storage material relative to the total volume of the activated carbon and the heat storage material contained in the fifth region 35.

Example 8

The first region 31 to the fourth region 34 are the same as those of Example 6.

A mixture of a heat storage material and an activated carbon is provided in the fifth region 35. As the activated carbon, 6 mm honeycomb pellets (with an outer diameter of 6 mm, an outer wall thickness of 0.6 mm, and a rib thickness of 0.4 mm) that have a BWC of 8.4 g/dL are used. As the heat storage material, a heat storage material that contains hexadecane as a phase change material that has a phase change temperature of 18° C. is used.

The fifth region 35 has a packing volume of 0.4 L, and 0.32 L of the activated carbon and 0.08 L of the heat storage material are mixed, and the mixture is packed in the fifth region 35. That is, the fifth region 35 is provided with 80 vol % the activated carbon and 20 vol % the heat storage material relative to the total volume of the activated carbon and the heat storage material contained in the fifth region 35.

Other Embodiments (1) In the third embodiment given above, the tank-side adjacent region T is divided into two divided regions (the first region 31 and the second region 32), but may be divided into three divided regions or more.

(2) In the embodiments given above, the filters F are provided between the regions, but the filters F may be omitted.

(3) In the embodiments given above, as the activated carbon, an activated carbon granulated and molded into a predetermined shape, crushed carbon that has a uniform grain size, hollow pellets, honeycomb pellets and the like are used as examples. As the heat storage material, microcapsule type heat storage materials granulated and molded into a predetermined shape are used. It is also possible to use a unitary material obtained by integrally molding an activated carbon and a heat storage material, and provide the unitary material in the tank-side adjacent region T.

The constituent elements disclosed in the embodiments given above (including other embodiments, the same applies hereinafter) may be combined and used with the constituent elements disclosed in other embodiments as long as there is no contradiction. Also, the embodiments disclosed in this specification are merely examples. Accordingly, the embodiments of the present invention are not limited thereto, and can be modified as appropriate without departing from the object of the present invention.

DESCRIPTION OF REFERENCE SIGNS

1: Case
2: Cover
3: Tank port
4: Purge port
5: Atmospheric air port
6: Partition wall
7: Auxiliary partition wall
8: Plate
9: Coil spring
90: Honeycomb pellet
91: Through hole
92: Partition wall
100: Canister
F: Filter
R: Adsorbent material chamber
T: Tank-side adjacent region
U: Atmospheric air-side adjacent region

The invention claimed is:

1. A canister for treating evaporated fuel, the canister comprising:
a tank port that is in communication with an upper air chamber of a fuel tank of an internal combustion engine;
a purge port that is in communication with an air intake path of the internal combustion engine;
an atmospheric air port that is open to atmospheric air; and
an adsorbent material chamber that contains an activated carbon that adsorbs evaporated fuel that flows from the tank port to the atmospheric air port,
wherein the adsorbent material chamber includes at least a tank-side adjacent region provided adjacent to the tank port and an atmospheric air-side adjacent region provided adjacent to the atmospheric air port,
a plurality of heat storage materials are provided in the tank-side adjacent region provided adjacent to the tank port, each of the plurality of heat storage materials being a material obtained by encapsulating, into capsules, one of a plurality of phase change materials that absorbs and releases latent heat according to changes in temperature wherein each of the plurality of phase change materials has a phase change temperature of 35° C. or more and 48° C. or less,
the activated carbon contained in the atmospheric air-side adjacent region has a BWC that is less than the BWC of the activated carbon contained in the tank-side adjacent region,
the tank-side adjacent region is divided into a plurality of divided regions, and
the phase change temperature of the phase change material contained in the heat storage material provided in a divided region is lower the closer the divided region is to the tank port.

2. The canister according to claim 1,
wherein an atmospheric air-side heat storage material is provided in the atmospheric air-side adjacent region, the atmospheric air-side heat storage material being a material that contains an atmospheric air-side phase change material that has a phase change temperature of 10° C. or more and less than 35° C.

3. The canister according to claim 1,
wherein the activated carbon contained in the atmospheric air-side adjacent region is in the form of hollow pellets that have a cavity inside or honeycomb pellets.

* * * * *